United States Patent [19]
Vaillancour et al.

[11] 4,212,085
[45] Jul. 8, 1980

[54] FREQUENCY ACTIVATED DIRECTION INDICATOR

[75] Inventors: Mary C. Vaillancour, 99 Cherry Hill Dr., Davison, Mich. 48423; Bruce L. Miller, Davison, Mich.

[73] Assignee: Mary C. Vaillancour, Flint, Mich.

[21] Appl. No.: 748,642

[22] Filed: Dec. 8, 1976

[51] Int. Cl.$^2$ .............................................. G01S 3/80
[52] U.S. Cl. .................................... 367/124; 367/129; 367/909; 367/111; 340/34
[58] Field of Search ................. 340/3 C, 16 R, 32, 33, 340/34; 73/556, 557, 558

[56] References Cited

U.S. PATENT DOCUMENTS

| | | | |
|---|---|---|---|
| 3,626,365 | 12/1971 | Press et al. | 340/34 |
| 3,710,313 | 1/1973 | Kimball et al. | 340/33 |
| 3,747,057 | 7/1973 | Brougher | 340/16 R |
| 3,913,084 | 10/1975 | Bollinger et al. | 340/261 |
| 4,028,947 | 6/1977 | Cowen | 73/557 |

OTHER PUBLICATIONS

Markus, *Guide Book of Electronic Circuits*, McGraw-Hill Book Co., 1974, pp. 257, 261–262.

*Primary Examiner*—Richard A. Farley
*Attorney, Agent, or Firm*—Basile and Weintraub

[57] ABSTRACT

A direction indicator giving a visual indication of the direction of origin of incident sounds having frequencies in a predetermined frequency range, is disclosed herein. The direction indicator embodies at least three sound detectors, each having an active filter passing electrical signals in a predetermined frequency range and a light emitting diode giving a visual indication of the intensity of the sound in the predetermined range received by the associated sound detector. Two of the sound detectors are disposed to preferentially receive sounds from opposite directions, and the third sound detector is disposed to receive sounds originating from a third direction normal to the directions of the first two. In the preferred embodiment, the direction indicator is an emergency vehicle direction indicator for use in an automobile giving the operator a visual indication of the direction of an emergency vehicle sounding its siren.

8 Claims, 5 Drawing Figures

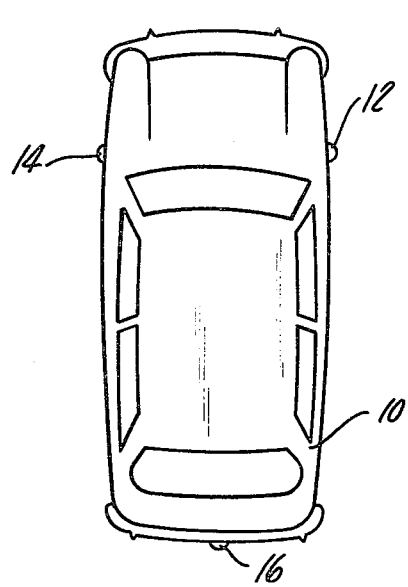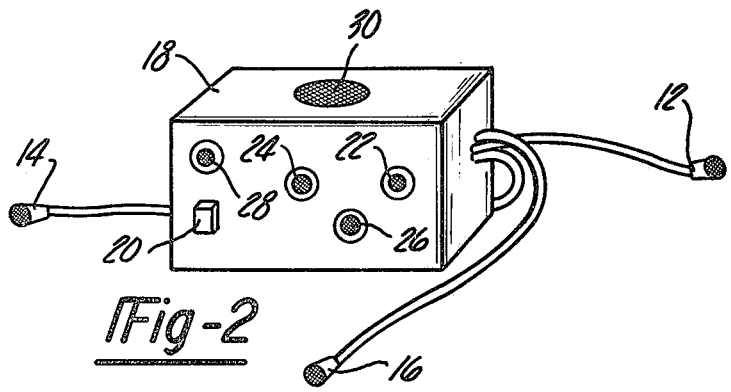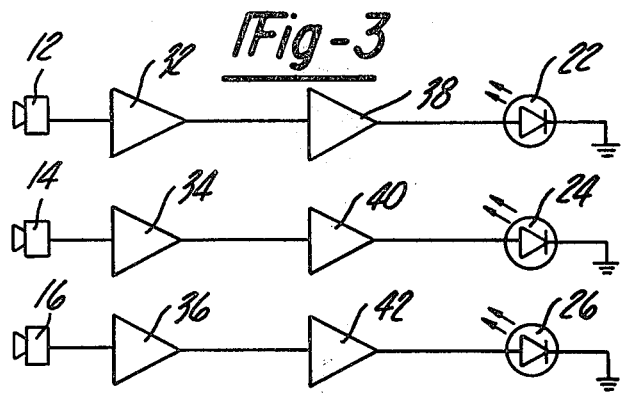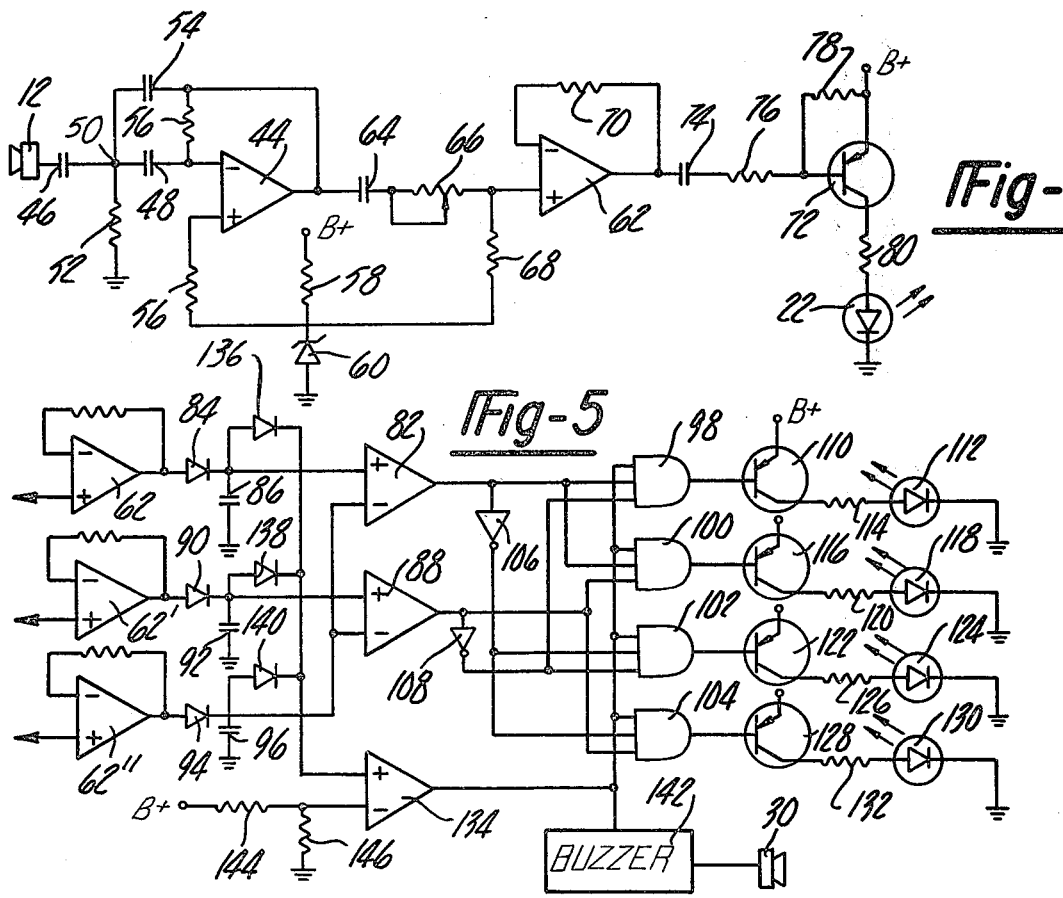

FREQUENCY ACTIVATED DIRECTION INDICATOR

BACKGROUND OF THE INVENTION

1. Field of the Invention

The field of the invention is related to direction indicators. More particularly, to a simple direction indicator for use in an automobile or similar vehicle for determining the direction of a source emitting sound waves above a predetermined frequency. Even more particularly, the present invention relates to the direction of an emergency vehicle having a siren emitting sound waves having a frequency above 1,000 hertz.

2. Prior Art

All too often one reads in the newspaper of an accident between an emergency vehicle, such as an ambulance, fire truck, or a police car and an automobile. The excuse usually given by the driver of the automobile is, "I didn't hear the siren", which all too often is a true statement. Modern automobiles are well sound proofed to block out street and road noises, and with the windows rolled up, the sound proofing is quite effective. Added to this fact, many of these automobiles are equipped with air conditioners which require that the windows be rolled up in both summer and winter. Most of the air conditioned automobiles lack the conventional side window vents, which normally prevent undersirable drafts and wind noises when the side windows are open. Therefore, there is a further tendency not to keep the side windows opened even in moderate weather, excluding outside sounds the year around. Finally, almost every vehicle is equipped with a radio, which is often played much too loud. Taking these factors in collectively, the operator of a vehicle is often quite oblivious to sounds originating outside the vehicle and, unfortunately, even the sirens of emergency vehicles. Even if he does hear the siren, he usually has no idea of where the emergency vehicle is, relative to his present location and his direction of travel.

The present invention is a frequency sensitive sound indicator, and in its preferred embodiment is a direction indicator sensitive to the frequency of an emergency vehicle's siren giving the operator a visual indication of the existance and direction of the source relative to his vehicle.

Audio direction indicators or finders are known in the prior art, and have been used by the military to indicate the direction of a distant gun implacement or the direction of an unseen sniper. These direction finders use two or more strategically placed microphones for detecting the sound. By knowing the exact position of the microphones, the direction of origin is determined by comparing the arrival times or phase differences of the sound incident at the different microphones. These systems are quite complex, relatively expensive and their accuracy is well above the needs for the automotive application discussed above. Closer to the disclosed invention is the "Relative Movement Responsive Siren Alert" taught by J. W. Perrin in U.S. Pat. No. 3,867,719 (February 1975), in which the doppler frequency of a siren is used to excite an indicator light visible giving the operator an indication of whether the source is approaching or retreating from the vehicle. The system, also, includes an audio alarm when the intensity of an approaching siren exceeds a predetermined value. Although the system taught by Perrin notifies the driver of an approaching emergency vehicle, the driver has no knowledge of the direction from which it is approaching. The disclosed invention overcomes this deficiency by giving the operator a further indication of the direction of the emergency vehicle.

SUMMARY OF THE INVENTION

The invention is an frequency activated detector for detecting a predetermined frequency. In the preferred embodiment the invention is a direction indicator having three sound detectors, such as microphones. One microphone is mounted on each side of the vehicle to preferentially detect sound waves originating from either side and one mounted at the rear of the vehicle to preferentially detect sound waves originating behind it. It is understood, that any siren, regardless of its direction, will be received by all three microphones. However, the microphones most directly facing the origin will produce the highest response. A microphone facing the forward direction is unnecessary since the flashing lights of an emergency vehicle are normally within the forward view of the vehicles' operator and, therefore, is relatively not as important as the other three directions. Further, the outputs of the three microphones can be used to generate information indicative of sound waves originating in the fourth direction.

Each microphone is connected to an active high pass filter attenuating lower frequency road and the sound street noises, and passing only the higher frequency sound of the siren. The filtered signals are amplified and applied to driver amplifiers, which activate three light emitting diodes mounted on a console within the operators filed of view. When the emergency vehicle is to the right of the vehicle, the light emitting diode associated with the microphone mounted on the right hand side of the vehicle will be the brightest. Likewise, when the emergency vehicle is to the left or rear of the vehicle, the light emitting diodes associated with the left or rear microphones, respectively, will be the brightest. When the source is ahead of the vehicle, the light emitting diodes associated with the right and left microphones will be excited to approximately the same brightness and the light emitting diode associated with the rear microphone will be dimmer. Alternatively, comparative logic may be used to electronically compare the outputs of the three amplifiers and only the light emitting diode indicative of the direction of the source will be excited. In an alternate embodiment, a fourth light emitting diode indicative of the forward direction may be embodied in the direction indicator without the need for a fourth microphone.

BRIEF DESCRIPTION OF THE DRAWINGS

FIG. 1 is a view of a vehicle provided with the microphones of the invention.

FIG. 2 shows the microphones and console of the invention.

FIG. 3 is a diagram of one embodiment of the invention.

FIG. 4 is a detailed illustration of the filter of FIG. 3.

FIG. 5 illustrates an alternate embodiment of the invention.

DESCRIPTION OF THE PREFERRED EMBODIMENT

Referring to FIG. 1, there is shown a top view of vehicle illustrated as an automobile 10 having a first microphone 12 disposed on its right side to preferentially detect sound waves originating to the right of the vehicle. A second microphone 14 is disposed on the left side and a third microphone 16 is disposed at the rear of the vehicle to preferentially detect sound waves originating to the left and rear of the vehicle, respectively. It is understood that the vehicle may be passenger automobiles, bus truck or any similar vehicle, even including a boat.

Now referring to FIG. 2, the three microphones 12, 14 and 16 are connected to a console 18 internally mounted within the vehicle and powered from the vehicles source of electrical power. This may be a battery or an engine driven generator or alternator, such as are commonly associated with a vehicle having an engine. The console 18 has an "ON-OFF" switch illustrated as push button switch 20 controlling the power to the console. Alternatively, electrical power may be applied directly to the console when the vehicles ignition switch is turned "ON." On the face of the console are mounted at least three light emitting diodes, the first light emitting diode 22 is associated with microphone 12, light emitting diodes 24 and 26 are associated with microphones 14 and 16, respectively. A pilot light 28 may be included to indicate when the console is in operation. A speaker 30 may, also, be included to reproduce the detected siren sound or activate a buzzer sound when the detected sound is above a predetermined level.

A block diagram of the circuit is shown in FIG. 3. Each of the three microphones 12, 14 and 16 is connected to associated active filters 32, 34 and 36, respectively. The microphones detect the incident sound waves and generate electrical signals having the same frequency characteristics as the incident sound waves and a value proportional to their intensity. The active filters 32, 34 and 36 attenuate the electrical signals having a frequency less than 1,000 hertz and passing with unity gain the signals having frequencies greater than 1,000 hertz. The higher frequencies passed by the active filters 32, 34 and 36 are amplified by amplifiers 38, 40 and 42, which provide sufficient electrical power to excite light emitting diodes 22, 24 and 26, respectively.

The circuit details of the active filter 32 and amplifier 42 are illustrated in the circuit diagram, FIG. 4. Since the circuits associated with all three microphones are identical, only one will be discussed in detail. Referring back to FIG. 4, microphone 12 may be any commercially avaliable microphone having sufficient sensitivity and a frequency response greater than 1,000 hertz. The output of the microphone is connected to the negative input of an operational amplifier 44 through serially connected capacitances 46 and 48, as shown. In the preferred embodiment, operational amplifier is one segment of a dual in-line integrated circuit such as type LM-3900 National Semiconductor of Santa Clara, California. This integrated circuit has been selected because it is operable over a wide range of voltages. The supply current drain is independent of supply voltage, requires low input bias current, has a wise band width, is internally compensated for unity gain and has output short circuit protection.

The junction 50, between capacitances 46 and 48, is connected to a common ground through resistance 52 and to the output of amplifier 44 through a feedback capacitance 54. The output of amplifier 44 is, also, connected back to the negative input of amplifier 44 in parallel with capacitances 48 and 54. The positive input to amplifier 44 is connected to a voltage source designated 0.5 B+ having a voltage approximately equal to one-half the source supply B+ through a resistance 56.

The source designated 0.5 B+ may be derived from a serially connected resistance 58 and a zener diode 60 connected between B+ and a common ground or a simple voltage divider network. The zener diode 60 has a break over potential of approximately one-half of the B+ potential. The symbol B+ as used herein has its conventional meaning and represents the positive terminal of the vehicle's source of electrical power. The ground symbol likewise has its conventional meaning and represents the negative terminal of the vehicles source of electrical power.

The output of amplifier 44 is connected to the positive terminal of a second operational amplifier 62 through series connected coupling capacitance 64 and adjustable resistance 66. Operational amplifier 44 in combination with coupling capacitance 64, resistances 52, 56 and 58 and capacitances 48 and 54 comprises the active filter 22. The value of the coupling capacitance 64 determines the cutoff frequency of the active filter 22 and is selected pass signals having frequencies higher than 1,000 hertz. In the preferred embodiment, amplifier 62 is the second segment of the dual in-line integrated circuit LM-3900 described with reference to amplifier 44, and the value of coupling capacitance 64 is 50 micro farads.

The positive input terminal of amplifier 62 is, also, connected to the terminal designated 0.5 B+ through a resistance 68. The output of amplifier 62 is connected back to its input in a feedback arrangement through a resistance 70. The output of amplifier 62 is, also, connected to the base of transistor 72 through a series connected capacitance 74 and resistance 76. The base of transistor 72 is, also, connected to B+ through resistance 78. The emitter of transistor 72 is connected directly to B+ and the collector is connected to the anode of light emitting diode 22 through resistance 80, and the cathode of the light emitting diode 22 is connected directly to ground.

The operation of the circuit is as follows: the signals generated by the microphone are applied to the active filter through capacitance 46 where the signals having frequencies greater than 1,000 hertz are passed with unity gain while those having frequencies less than 1,000 hertz are attenuated. The operation of the active filter is well known to those skilled in the art. Briefly, the input signals are inverted by the operational amplifier 44 and input to capacitance 64. The impedance of capacitance 64 is an inverse function of the signal frequency, therefore, capacitance 64 is a lower impedance to the high frequencies and a high impedance to the lower frequency signals. The inverted low frequency signals, therefore, are preferentially fed back to the input through capacitance 54 and 46 and further attenuates the value of the low frequency signals being received from the microphone.

Variable resistance 66 and resistance 68 form a voltage divider for the signals passed by capacitance 64 and control the value of the signals input to amplifier 62. The signals are amplified by amplifier 62 and applied to the base of transistors 72 through capicitance 74. Resistance 78 applies the B+ potential to the base of transistor 72 holding it in the nonconducting state. The positive portion of the signals output by amplifier 62 causes an increase in the potential at the base holding it in the nonconductive state while the negative portion of the signals forward biases transistor 72 into conductance.

The current flow through transistor 72 is applied to the anode of light emitting diode 22 causing it to emit. Intermediate resistance 80 limits the current flow to the light emitting diode to prevent it from burning out.

An alternate embodiment using comparative logic is illustrated on FIG. 5. The output of amplifier 62, associated with microphone 12, is connected to the positive input of a comparator 82 through a diode 84. A capacitor 86 is, also, connected between the cathode of diode 84 and ground. Diode 84 and capacitor 86 form a half wave rectifier providing a positive DC input to the positive terminal of the comparator 82. The comparator 82 is a commercially available integrated circuit having a positive output when the potential at the positive terminal is greater than the potential at the negative terminal, and an output signal indicative of a ground potential when the value of the potentials at the two input terminals are reversed.

In a like manner, the output of amplifier 62' associated with microphone 14, is applied to the positive input of comparator 88 through a diode 90 having a capacitance 92 connected between its cathode and ground. Amplifier 62" associated with the rear microphone 16 is connected to the negative inputs of comparators 82 and 88 through a diode 94, capacitance 96 forms a half wave recifier in combination with diode 94. The output of comparator 82 is connected directly to inputs of AND gates 98 and 100 and the inputs of AND gate 102 inputs of AND gate 100 and 102 and to the inputs of AND gates 98 and 104 through inverting amplifier 108.

The output of AND gate is connected to the base of transistor 110. The collector of transistor 110 is connected to B+ while its emitter is connected to the anode of a light emitting diode 112 through resistance 114. The cathode of light emitting diode 112 is connected to a common ground potential. In a like manner, the outputs of AND gates 100, 102 and 104 are connected to the bases of transistors 116, 122 and 128, respectively. Transistors 116, 122 and 128 have their respective emitters connected to B+ and their collectors connected to light emitting diodes 118, 124 and 130. through resistances 120, 126 and 132, respectively. The cathodes of light emitting diodes are connected to ground.

The input of a differential amplifier 134 is connected to the cathodes of diodes 84, 90 and 94 through diodes 136, 138 and 140, respectively. The output of amplifier 134 is connected to an input to AND gates 98, 100, 102 and 104.

The operation of the circuit is as follows: The A.C. outputs of amplifiers 62, 62', 62" are rectified by half wave rectifiers comprising diodes 84 and 86, and 90 and capacitances 92, 94 and 96 respectively, producing a D.C. signal at the positive and negative inputs of comparators 82 and 88 indicative of the signals received at microphones 12, 14 and 16. Comparator 82 compares the value of the signal generated by microphone 12 on the right side of the vehicle with the valve of the signal generated by microphone 16 at the rear of the vehicle. The output of comparator 82 is positive if the value of the signal received by microphone 12 is greater than the value of the signal received by microphone 16, and the output is a ground signal if the values of the two signals are reversed. In a like manner, comparator 88 compares the value of the signals received by microphones 14 on the left side of the vehicle with the valve of the signal received by microphone 16 at the rear. The following truth table will be helpful in explaining the following logic.

| Orgin of the sound waves | Output of Comparator 82 | Output of Comparator 88 |
| --- | --- | --- |
| right | positive | negative |
| rear | negative | negative |
| left | negative | positive |
| front | positive | positive |

The truth table shows that all four directions can be determined from the value of the output signals of the two comparators 82 and 88. When the output of comparator 82 is positive and the output of comparator 88 is negative, AND gate 98 is activated and energizes light emitting diode 112 through transistor 110. When the value of the output signals are reversed, AND gate 104 is activated, exciting light emitting diode 130 by means of transistor 132. When the outputs of both comparators are positive AND gate 100 is activated exciting light emitting diode 118 by means of transistor 116. When the output of both comparators are negative, AND gate 102 is activated and excites light emitting diode 124 by means of transistor 122.

The rectified outputs of amplifiers 62, 62', and 62" are, also, applied to differential amplifier 134, which generates an output when the rectified output from any one or combination of amplifiers exceeds a predetermined threshold determined by the voltage divider comprising resistance 144 and 146. The output of amplifier 134 activates all four AND gates only when a signal is present otherwise random street noise may cause a false signal. The output of amplifier 134 may, also, be used to generate an audio device such as buzzer 142 activating loud speaker 30. The excited light emitting diode is indicative of the direction of the origin.

The application of the invention is not limited to just an emergency vehicle direction indicator, and has various other applications. The same type of device may be used on a fog bound boat for locating the general direction of a particular sound. The sound may be a fog horn on another boat, a sound bouy or a shore installation. For these and other applications the pass frequency of the sound to be detected.

Having, thus, described the invention what is claimed is:

1. A direction indicator comprising:
    first sound indicator means preferentially detecting incident sound waves in a predetermined frequency range, originating from a first direction for generating a visual indication having a brightness proportional to the intensity of the incident sound waves in said predetermined frequency range;
    second sound indicator means preferentially detecting incident sound waves in said same predetermined frequency range, originating from second direction opposite said first direction for generating a visual signal having a brightness proportional to the incident sound waves, in said predetermined frequency range; and
    third sound indicator means preferentially detecting incident sound waves in said same predetermined frequency range, originating from a third direction normal to said first and second directions for generating a visual signal having a brightness proportional to the incident sound waves in said predetermined frequency range.

2. The direction indicator of claim 1 wherein said first, second and third sound indicators, each comprises:

a sound detector generating electrical signals having the same frequency characteristics as an incident sound wave and a value proportional to the intensity of said incident sound waves;

integrated circuit means for amplifying said electrical signals, said integrated circuit means having at least a first and a second operational amplifier;

circuit means in circuit relationship with said first operational amplifier for limiting the transmission of said electrical signals as a function of the frequency; said circuit means in combination with said first operational amplifier forming an active filter transmitting with unity gain all electrical signals having frequencies above a predetermined frequency and attenuating all electrical signals having frequencies below said predetermined frequency;

driver amplifier means receiving the electrical signals transmitted by said active filter and said second operational amplifier for generating excitation signals having values proportional to the value of the electrical signals passed by said active filter; and indicator means for generating a visual signal proportional to the value of said excitation signal.

3. The direction indicator of claim 2 wherein said predetermined frequency range is all frequencies above a predetermined frequency, said circuit means comprises:

a coupling capacitance connected between the output of said first operational amplifier and the input of said second operational amplifier, said coupling capacitance having a value selected to have a low impedance for electrical signals having frequencies above said predetermined frequency and a higher impedance for all electrical signals having frequencies below said predetermined frequency; and feedback means for transmitting the signals output from said first operational to the input of said first operational amplifier to attenuate the electrical signals received from said sound detector having frequencies below said predetermined frequency.

4. The direction of indicator of claim 1 wherein said indicator means is a light emitting diode.

5. The direction indicator of claim 2 further including a housing having a front panel, said housing means having said integrated circuit means, said circuit means and said driver amplifier means disposed therein, and said front panel having said indicator means disposed thereon, said front panel means further including a switch having an ON and OFF position controlling electrical power from an external source to said integrated circuit means said circuit means said driver amplifier means, and said indicator means, and a pilot light receiving electrical power from said switch in said "ON" position to give a visual indication that electrical power is being supplied.

6. In combination with an automotive vehicle having a front, a rear, a right side and left side, said vehicle having a longitudinal axis passing through said front and rear and a transverse axis, normal to said longitudinal axis passing through said right and left sides, an emergency vehicle direction indicator, comprising at least first sound amplifier means disposed to preferentially receive incident sound waves originating to the right of said vehicle along said transverse axis, said first sound amplifier generating a first output signal having a value proportional to the incident sound waves having frequencies above a predetermined frequency;

second sound amplifier means disposed to preferentially receive incident sound waves originating to the left of said vehicle along said transverse axis, said second sound amplifier means generating second output signal having a value proportional to the incident sound waves having frequencies above said same predetermined frequency;

third sound amplifier means disposed to preferentially receive incident sound waves originating from a direction along said longitudinal axis, said third sound amplifier means generating a third output signal having a value proportional to the incident sound waves having frequencies above said same predetermined frequency; and first comparator means receiving said first and third output signals for generating a first compared signal indicative of the value of said first output signal being greater than said third output signal and a second compared signal indicative of the value of said third output signal having a value greater than said first output signal;

second comparator means receiving said second and third output signals for generating a third compared signal when the value of said second output signal is greater than the value of said third output signal and a fourth compared signal when the value of said third output signal is greater than the value of said second output signal;

logic means having four outputs, each of said outputs indicative a predetermined direction, said logic means generating a signal on one of said outputs in response to said first, second, third and fourth compared signals;

visual indicator means connected to each of the four outputs of said logic means for generating a visual signal indicative of the direction from which said sound waves are originating in response to the signal generated by said logic means.

7. The combination of claim 6 logic means further includes means enabling said logic means to generate said signal only in response to an enable signal, said combination further includes a third comparator for generating said enable signal in response to anyone of said first, second and third output signal having a value greater than a predetermined value.

8. The combination of claim 7 further including an audio means for generating an audable sound in response to said enable signal.

* * * * *